United States Patent
Di Gregorio (10) Patent No.: US 7,180,332 B2
(45) Date of Patent: Feb. 20, 2007

(54) CLOCK SYNCHRONIZATION CIRCUIT

(75) Inventor: Lorenzo Di Gregorio, Eching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/536,282

(22) PCT Filed: Nov. 14, 2003

(86) PCT No.: PCT/EP03/12747

§ 371 (c)(1),
(2), (4) Date: Jan. 4, 2006

(87) PCT Pub. No.: WO2004/049140

PCT Pub. Date: Jun. 10, 2004

(65) Prior Publication Data

US 2006/0140317 A1    Jun. 29, 2006

(30) Foreign Application Priority Data

Nov. 28, 2002   (DE) .............................. 102 55 685

(51) Int. Cl.
*H03K 19/00* (2006.01)
*H03K 19/096* (2006.01)
*H01L 7/00* (2006.01)

(52) U.S. Cl. .................. 326/96; 326/93; 326/94; 326/95; 326/97; 326/98; 327/141; 327/144; 327/145; 327/153

(58) Field of Classification Search ............ 326/93–98
See application file for complete search history.

(56) References Cited

U.S. PATENT DOCUMENTS 5,256,912 A * 10/1993 Rios ........................... 327/144

(Continued)

FOREIGN PATENT DOCUMENTS

DE            69428071           4/2002

(Continued)

OTHER PUBLICATIONS

Semeraro et al., "Energy-Efficient Processor Design Using Multiple Clock Domains with Dynamic Voltage and Frequency Scaling," *Proceedings of the Eighth International Symposium on High-Performance Computer Architecture*, pp. 24-35, Feb. 2002.

(Continued)

*Primary Examiner*—Rexford Barnie
*Assistant Examiner*—Dylan White
(74) *Attorney, Agent, or Firm*—Jenkins, Wilson, Taylor & Hunt, P.A.

(57) ABSTRACT

A clock synchronization circuit for synchronizing a first clock signal and a second clock signal for data transfer from a first function block, which is clocked by the first clock signal, to a second function block which is clocked by the second clock signal, where the clock synchronization circuit has a sampling unit for sampling the second clock signal using the first clock signal in order to generate samples and edge detection values of the sampled second clock signal, a logic circuit for outputting the generated edge detection values as a reconstructed clock signal and generating an Edge-too-Early signal and an Edge-too-Late signal; and a signal delay circuit, which delays the reconstructed second clock signal on the bases of the Edge-too-Early signal or the Edge-too-Late signal.

10 Claims, 8 Drawing Sheets

U.S. PATENT DOCUMENTS

| | | | |
|---|---|---|---|
| 5,272,391 A | 12/1993 | Ampe et al. | |
| 5,548,620 A * | 8/1996 | Rogers | 375/354 |
| 5,638,015 A | 6/1997 | Gujral et al. | |
| 5,654,988 A * | 8/1997 | Heyward et al. | 375/355 |
| 5,721,866 A * | 2/1998 | Ballard | 711/138 |
| 5,905,766 A * | 5/1999 | Nguyen | 375/354 |
| 6,219,395 B1 * | 4/2001 | Pollack et al. | 375/371 |
| 6,327,207 B1 | 12/2001 | Sluiter et al. | |
| 6,359,479 B1 * | 3/2002 | Oprescu | 327/141 |
| 6,366,991 B1 * | 4/2002 | Manning | 711/167 |
| 6,425,088 B1 * | 7/2002 | Yasukawa et al. | 713/400 |
| 6,744,285 B2 * | 6/2004 | Mangum et al. | 326/96 |
| 6,988,215 B2 * | 1/2006 | Splett et al. | 713/400 |

FOREIGN PATENT DOCUMENTS

| | | |
|---|---|---|
| EP | 1113353 | 7/2001 |
| WO | WO 01/79987 | 10/2001 |

OTHER PUBLICATIONS

German Office Action dated Sep. 11, 2003.
International Search Report dated Oct. 18, 2004 and International Preliminary Report on Patentability dated Mar. 21, 2005.

* cited by examiner

Truth table

| S'$_t$ | S$_t$ | S$_{t-1}$ | E$_t$ |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 1 |
| 1 | 0 | 1 | 0 |
| 1 | 1 | 0 | 1 |
| 1 | 1 | 1 | 0 |

CLOCK SYNCHRONIZATION CIRCUIT

This application is a 371 of PCT/EP03/12747 filed on Nov. 14, 2003.

TECHNICAL FIELD

The invention relates to a clock synchronization circuit for synchronizing two clock signals for data transfer between function blocks in different time domains.

BACKGROUND ART

Digital circuits in many cases contain various function blocks which operate in different time domains and interchange data with one another. In this case, the different function blocks are clocked by clock signals at different clock frequencies. If the logic function blocks are supplied with different clock signals as time reference, it is necessary to ensure that data signals which are transmitted from one function block to the other function block are not misinterpreted.

There may be different reasons for providing various, uncorrelated time domains on a chip. The signal distribution of the clock signal over the entire chip is not possible in many applications, since the clock frequency is too high. The random phase difference between the various clock signals may have a high level of variability in comparison with the frequency. A further possibility is for the clock signal to be generated from an external datastream.

Among the totally uncorrelated clock signals, there are also instances of correlated clock signals with variable correlation. Variable correlation is typical of the dynamic frequency scaling of partial circuit units. It is possible to read about various options which can be presented by a plurality of different time domains in G. Semeraro, G. Magklis, R. Balasubramonian, D. H. Albonesi, S. Dwarkadas and M. L. Scott, "Energy-Efficient Processor Design Using Multiple Clock Domains with Dynamic Voltage and Frequency Scaling", 8th International Symposium on High-Performance Computer Architecture, pp. 29–40, February 2002, for example.

The data signals which are transmitted between function blocks in different time domains cannot be sampled by conventional registers, since the register's setup time may be infringed by the data signal received, in which case the register is put into a "metastable" state. In this case, the phase difference between the two time domains is unknown. The reason for this may either be that the variance in the signal is too great or that the inaccuracy of the result value is too high. A metastable register generates an inadmissible data output value, since the output voltage remains in a mid-range between the supply voltage and the ground voltage. This inadmissible output value may result in inadmissible data values in further gates and hence in a malfunction by other devices on the entire chip.

For this reason, specially designed registers, "synchronizers", have been proposed which reduce the probability of a metastable state arising. Such synchronizers essentially comprise two cascaded, edge-triggered flipflops. A single-staged synchronization register has too great a mean time between failures (MTBF) in any case. For many applications, it is possible to use a synchronization register with two cascaded, edge-triggered flipflops, since the mean time between failures MTBF can be regarded as adequate. At very high clock frequencies, use is sometimes made of two cascaded, edge-triggered flipflops to achieve a sufficiently high mean time between failures MTBF. The more independent synchronization registers there are, the shorter the joint mean time between failures MTBF. The provision of such synchronization registers is a constant source of uncertainty in the circuit design.

To overcome the uncertainties in the data transfer between function blocks in different time domains, various technical proposals have been set forth which can be divided into two main groups, namely "handshake techniques" and queue techniques.

Figure 1:
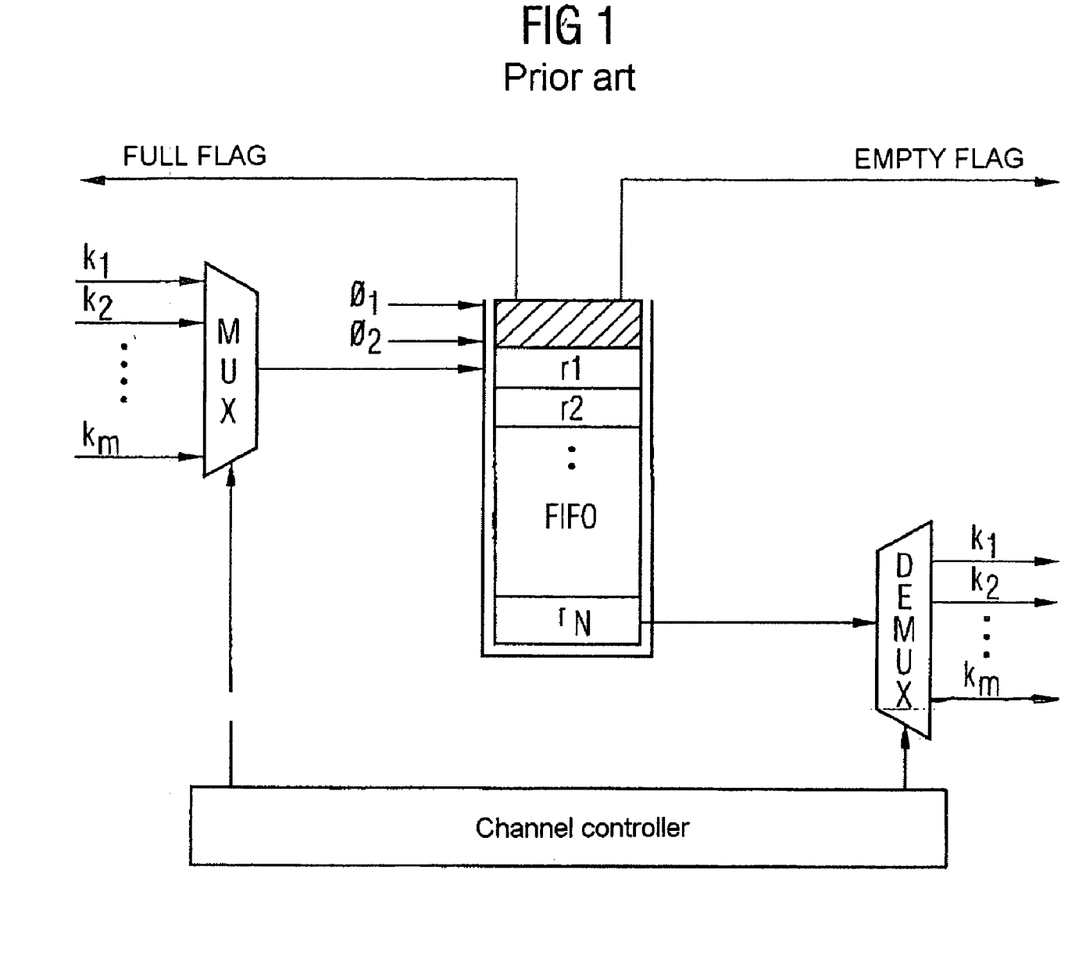
FIG. 1 shows a data transfer interface with queues based on the prior art.

FIG. 1 shows an example of data transfer using queues. This circuit uses an FIFO register to transfer data between function blocks in different time domains. The FIFO register comprises a large number of storage registers $R_i$. The FIFO register is clocked by a first clock signal $\Phi_1$ and with a second clock signal $\Phi_2$. The data are written to the FIFO register at the clock frequency of the first clock signal $\Phi_1$ and are read from the FIFO register at the clock frequency of the second clock signal $\Phi_2$. In the example illustrated, the data which have been written come from various data channels $K_i$ which are selected by a channel controller using a multiplexer. The channel controller also actuates a demultiplexer on the output side of the FIFO register for the purpose of further data transmission via various data channels $K_i$. A Full indicator flag indicates to a function block in the first time domain that the FIFO register is full, and an Empty indicator flag indicates to a function block in the second time domain that the FIFO register is empty.

If data are to be transmitted from the data channel $K_i$ in the first time domain to every data channel $K_i$ in the second time domain, "head-of-line blocking" may occur. In this case, the queue is blocked by a channel if the corresponding output channel is not ready.

A further approach to solving the synchronization problem between function blocks in different time domains is a handshake implementation. An example of such a handshake implementation is described in U.S. Pat. No. 5,291,529.

Figure 2:
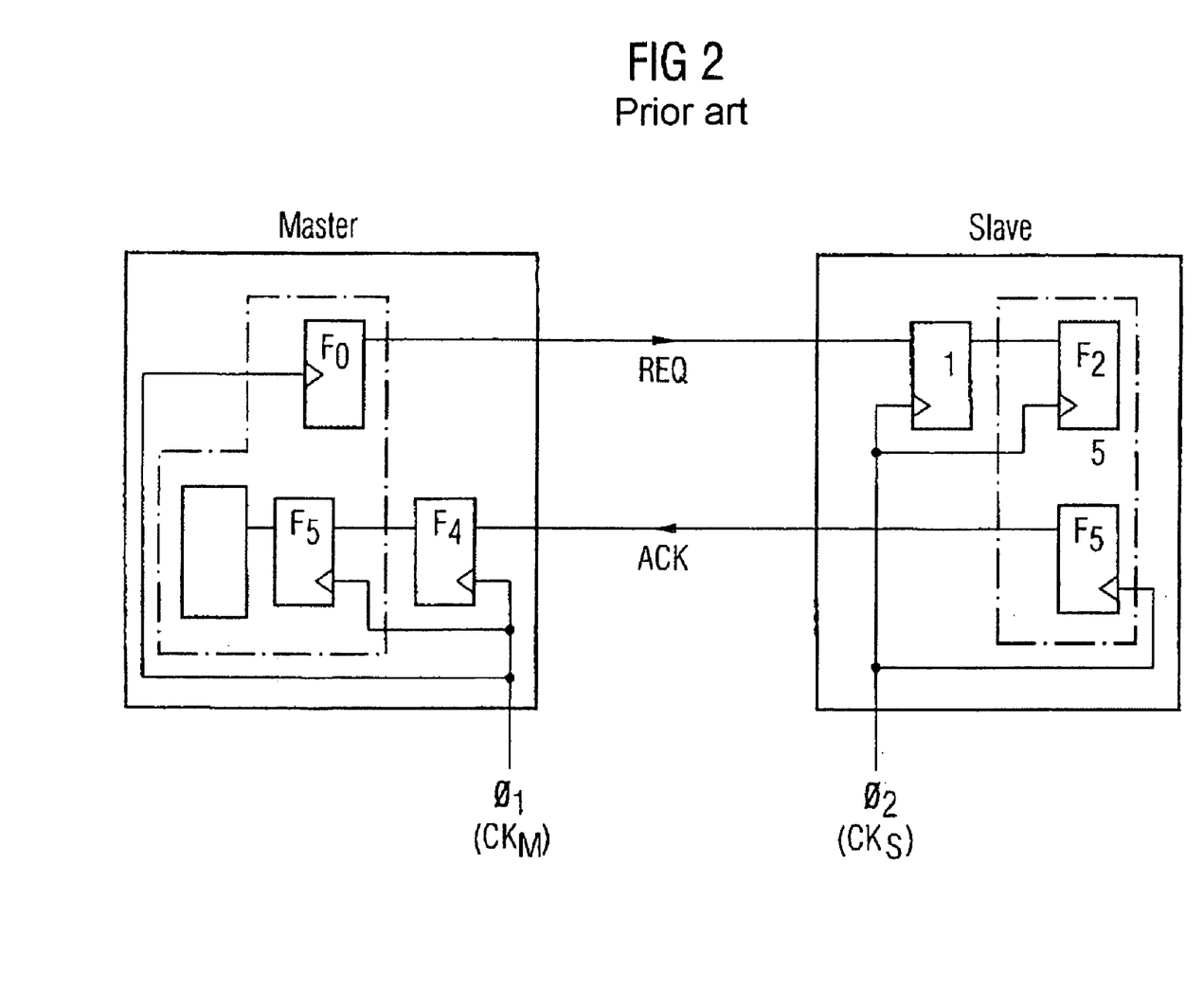
FIG. 2 shows the basic design of a handshake implementation based on the prior art.

FIG. 2 shows the principle of a handshake implementation between two function blocks with synchronous logic which operate in different time domains. The "master" is clocked using a first clock signal $\Phi_1$, and a slave unit is clocked using a second clock signal $\Phi_2$. The clock frequencies of the two clock signals are different in this case. To transmit data, the master circuit unit sends a request signal to the slave unit. The slave unit detects the request signal and performs the request. The slave unit then indicates that the task has been performed to the master unit by returning an acknowledgement signal to the master unit. Since, as in the example illustrated, the master unit and the slave unit do not have a common time base, i.e. they are clocked by clock signals at different clock frequencies, it is a fundamental matter to ensure that the data signals which are interchanged between the master unit and the slave unit are not misinterpreted on account of metastable states.

Particularly transferring data from a function block which is clocked at a high clock frequency to a function block which is clocked at a lower clock frequency is critical and can be achieved only in complex fashion using conventional circuitry. The particular problem with a conventional handshake implementation is that the function block which is clocked by the slow clock signal reacts too late to a request from a function block which is clocked by a clock signal at a higher clock frequency.

SUMMARY OF THE INVENTION

It is therefore the object of the present invention to provide a clock synchronization circuit using little circuit complexity which ensures reliable data transfer of data between function blocks which operate in different time domains.

The invention achieves this object by means of a clock synchronization circuit having the features specified in patent claim 1.

The invention provides a clock synchronization circuit for synchronizing a first clock signal ($\Phi_1$) and a second clock signal ($\Phi_2$) for data transfer from a first function block, which is clocked by the first clock signal ($\Phi$) at a relatively high clock frequency ($f_{\Phi 1}$), to a second function block, which is clocked by the second clock signal ($\Phi_2$) at a relatively low clock frequency ($f_{\Phi 2}$), where the clock synchronization circuit has: a sampling unit for sampling the second clock signal ($\Phi_2$) using the first clock signal ($\Phi_1$) in order to generate samples (S) and edge detection values (E) of the sampled second clock signal ($\Phi_2$), a logic circuit, clocked using the first clock signal ($\Phi_1$), for outputting the generated samples (S) or the edge detection values (E) as a reconstructed second clock signal ($\Phi_2'$) in the time frame of the first clock signal ($\Phi_1$) at an output of the logic circuit, where the output of the logic circuit is reset after outputting a value (S, E) until the logic circuit receives an Enable signal, where the logic circuit generates an Edge-Too-Early signal (ETE) if the generated edge detection value (E) is at logic high before the Enable signal is received, and generates an Edge-Too-Late signal (ETL) if the Enable signal is received before the generated edge detection value (E) is at logic high, and a signal delay circuit, clocked using the first clock signal ($\Phi_1$), which delays the reconstructed second clock signal ($\Phi_2'$) with a variable time delay ($\tau$) on the basis of the Edge-Too-Early signal (ETE) and the Edge-Too-Late signal (ETL).

In one preferred embodiment, the reconstructed second clock signal ($\Phi_2'$) activates a first edge-triggered flipflop, clocked by a first clock signal ($\Phi_1$), in a data transfer buffer for buffering data which are output by the first function block.

In one preferred embodiment, the first edge-triggered flipflop has a downstream second edge-triggered flipflop, clocked by the second clock signal ($\Phi_2$), in the data transfer buffer, and this second edge-triggered flipflop sends the buffered data to the second function block.

The logic circuit in the inventive clock synchronization circuit preferably takes an operating-mode control signal as a basis for outputting either the samples (S) or the edge detection values (E) as a reconstructed second clock signal ($\Phi_2'$).

The signal delay circuit preferably delays the reconstructed second clock signal ($\Phi_2'$) with a time delay ($\tau$) which is a multiple (N) of the clock cycle ($T_1$) of the first clock signal ($\Phi_1$), the multiplication factor (N) being a time-delay transfer function of the Edge-Too-Early signal (ETE) and of the Edge-Too-Late signal (ETL).

In this case, the time-delay transfer function is preferably stored in a transfer-function logic unit in the signal delay circuit.

The transfer-function logic unit preferably controls a multiplexer for connecting one of the outputs of a chain of delay elements to the logic circuit as the Enable signal.

In this case, the delay elements are preferably clocked by the first clock signal ($\Phi_1$).

In one preferred embodiment of the inventive clock synchronization circuit, the transfer-function logic unit in the signal delay circuit is programmable.

The sampling unit in the inventive clock synchronization circuit preferably contains a first register, comprising two series-connected, edge-triggered flipflops, for sampling the second clock signal ($\Phi_2$) with the rising signal edge of the first clock signal ($\Phi_1$), and a second register, comprising two series-connected, edge-triggered flipflops, for sampling the second clock signal ($\Phi_2$) with the falling signal edge of the first clock signal ($\Phi_1$), where the first register and the second register are connected in parallel in order to receive the second clock signal ($\Phi_2$) from the second function block, and a signal edge detector which is clocked by the first clock signal ($\Phi_1$) and which takes the sent sample from the first register and the sent sample from the second register and the sample which was output in the preceding clock cycle as a basis for sending an edge detection value to the logic circuit.

In one preferred embodiment of the inventive clock synchronization circuit, the reconstructed second clock signal ($\Phi_2'$) is sent to the second function block as an indicator signal, the indicator signal indicating that the data transfer buffer has data buffered in it which are to be read by the second function block.

Preferred embodiments of the inventive clock synchronization circuit are also described with reference to the appended figures in order to explain features which are fundamental to the invention.

BRIEF DESCRIPTION OF THE INVENTION

DETAILED DESCRIPTION OF THE INVENTION

Figure 3:
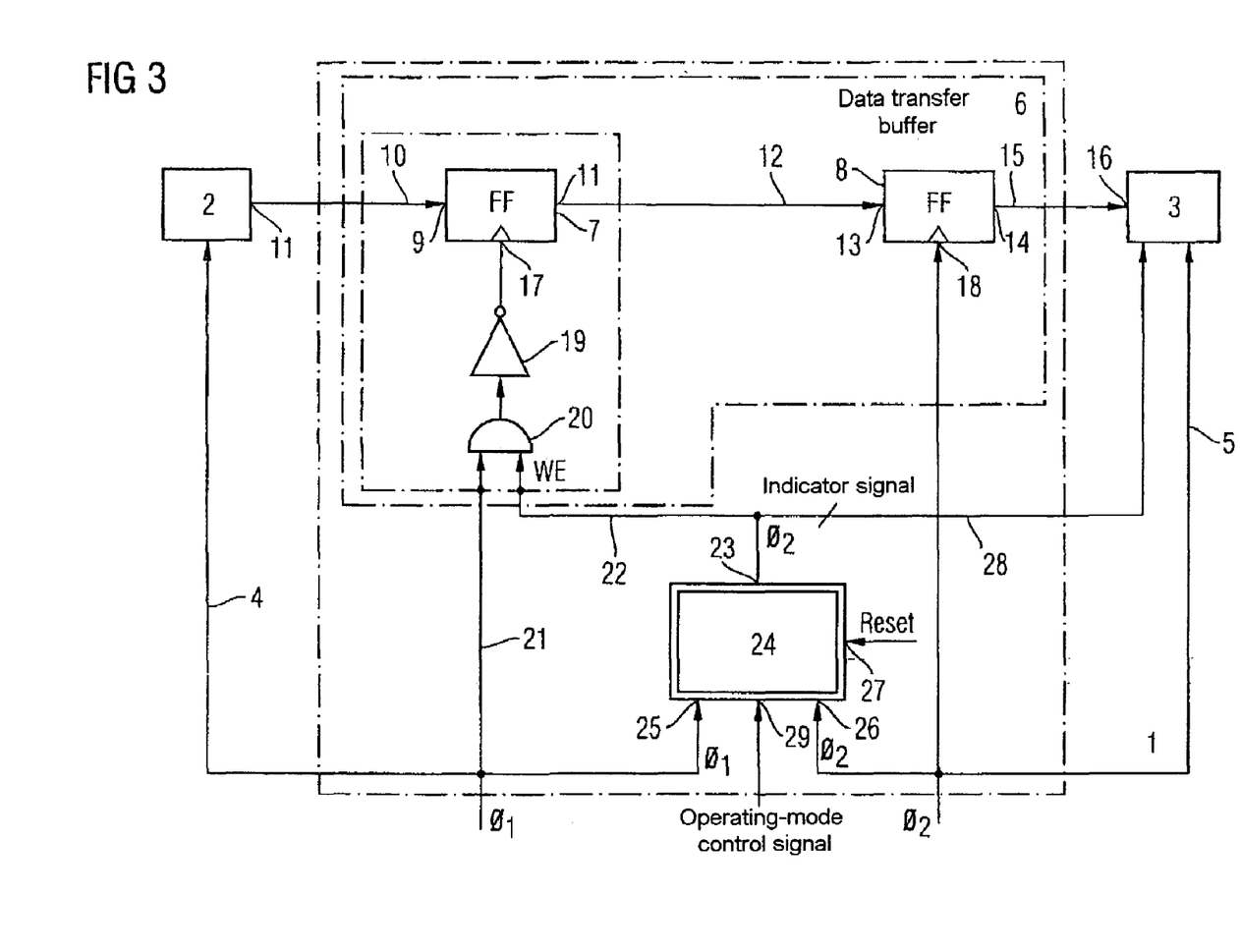
FIG. 3 shows a block diagram of the inventive clock synchronization circuit.

As can be seen from FIG. 3, an interface circuit 1 is connected up for data transfer between a first function block 2 and a second function block 3. The interface circuit 1 is used to transfer data between the two function blocks 2, 3, which operate in different time domains. The function blocks 2, 3 are arbitrary, synchronously operating data processing circuits which are each clocked with a clock signal. The two clock signals $\Phi_1$, $\Phi_2$ are uncorrelated or have variable correlation. The first function block 2 is clocked by the first clock signal $\Phi_1$ at a relatively high clock frequency $f_{\Phi 1}$ via a clock line 4. The second function block 3 is supplied with the second clock signal $\Phi_2$ via a clock line 5. The second clock signal $\Phi_2$ has a lower clock frequency $f_{\Phi 2}$ than the first clock signal $\Phi_1$. The data transfer interface circuit 1 ensures that data are transferred from the first function block 2 to the second function block 3 without metastable data states and hence data errors arising. The data transfer interface circuit 1 contains a data transfer memory 6 which comprises two series-connected edge-triggered flipflops 7, 8.

The data input 9 of the first edge-triggered flipflop 7 is connected to a data output 11 of the first function block 2 via a data line 10. The flipflop 7 has a data output 11 which is connected to a data input 13 of the second edge-triggered flipflop 8 via an internal data line 12 in the data transfer buffer 6. The second edge-triggered flipflop 8 likewise has a data output 14, which sends buffered data via a data line 15 to a data input 16 of the second function block 3.

The two flipflops 7, 8 contained in the data transfer buffer 6 each have a clock input 17, 18. The clock input 17 of the first flipflop 7 is connected to an inverter circuit 19, whose input is connected to the output of an AND gate 20. The AND gate 20 logically combines the first clock signal $\Phi_1$, supplied via a line 21, with a Write-Enable signal WE, which is sent via a line 22 from a signal output 23 in the inventive clock synchronization circuit 24. The clock synchronization circuit 24 has two clock signal inputs 25, 26. The first clock signal input 25 receives the first clock signal $\Phi_1$, which is used to clock the first function block 2 (first time domain). The second clock signal input 26 of the clock synchronization circuit 24 is supplied with the second clock signal $\Phi_2$, which clocks the second function block 3. In addition, the clock synchronization circuit 24 has a Reset input 27 for receiving a Reset signal. The clock synchronization circuit 24 is used for synchronizing the two clock signals $\Phi_1$, $\Phi_2$. In so doing, the clock synchronization circuit 24 generates a reconstructed second clock signal $\Phi_2'$ in the time frame of the first clock signal $\Phi_1$ and sends this signal to the first flipflop 7 within the data transfer buffer 6 via the line 22 as a Write-Enable signal WE. In addition, the reconstructed second clock signal $\Phi_2'$ is sent to the second function block 3 via an indicator signal line 28. This indicator signal indicates to the function block 3 that the data transfer buffer 6 contains data ready for reading.

The clock synchronization circuit 24 uses a further signal input 29 to receive an operating-mode control signal for changing over between two operating modes.

Figure 4:
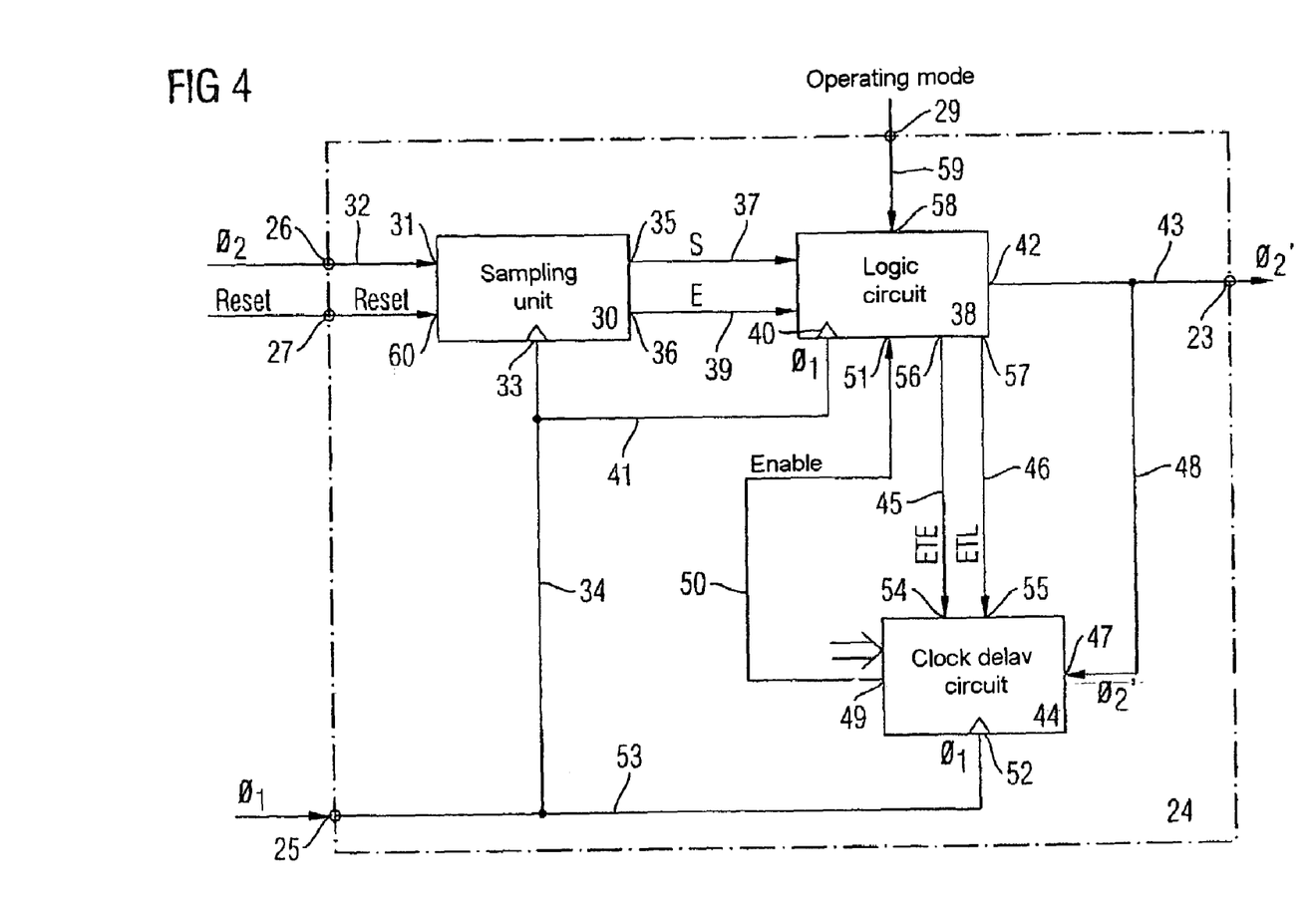
FIG. 4 shows the circuit design of a preferred embodiment of the inventive clock synchronization circuit.

FIG. 4 shows the circuit design of the inventive clock synchronization circuit 24, as is illustrated in FIG. 3.

The clock synchronization circuit 24 comprises a sampling unit 30 for sampling the second clock signal $\Phi_2$ using the first clock signal $\Phi_1$, with the sampling unit 30 generating samples S and edge detection values E of the sampled second clock signal $\Phi_2$. The sampling unit uses a signal input 31, which is connected to the input 26 via a line 32, to receive the second clock signal $\Phi_2$. The sampling unit 30 contains a clock signal input 33 which receives the applied first clock signal $\Phi_1$ via an internal clock signal line 34. The sampling unit 30 has two outputs 35, 36. It uses the first output 35 to send the samples S to a downstream logic circuit 38 via a line 37. The ascertained edge detection values E of the sampled second clock signal $\Phi_2$ are likewise sent to the logic circuit 38 via a line 39. For its part, the logic circuit 38 has a clock signal input 40 which receives the first clock signal $\Phi_1$ via an internal clock line 41 for the purpose of clocking the logic circuit 38.

The logic circuit 38 has an output 42 which is connected to the signal output 23 of the clock synchronization circuit 24 via a line 43.

The logic circuit 38 generates an "Edge-Too-Early" signal ETE if the edge detection value E which is sent by the sampling unit 30 adopts a logic high value before an Enable signal. Otherwise, the logic circuit 38 generates an Edge-Too-Late signal ETL if the Enable signal is received by the logic circuit 38 before the edge detection value E is at logic high. In this case, the Enable signal comes from a clock signal delay circuit 44 within the clock synchronization circuit 24. The logic circuit 38 sends the Edge-Too-Early signal ETE via a line 45 and sends the Edge-Too-Late signal ETL via a line 46 to the clock signal delay circuit 44. The clock signal delay circuit 44 has a signal input 47 which is connected to the output 42 of the logic circuit 38 via a line 48. The clock signal delay circuit 44 has an output 49 which applies the Enable signal to an input 51 of the logic circuit 38 via a line 50. The clock signal delay circuit 44 has a clock signal input 52 which receives the first clock signal $\Phi_1$ via an internal clock line 53. In addition, the clock delay circuit 44 has two inputs 54, 55 for receiving the Edge-Too-Early signal ETE and for receiving the Edge-Too-Late signal ETL which are sent by the logic circuit 38 via the outputs 56, 57.

In addition, the logic circuit 38 contains a signal input 58 for receiving the operating-mode control signal via a line 59.

Figure 5:
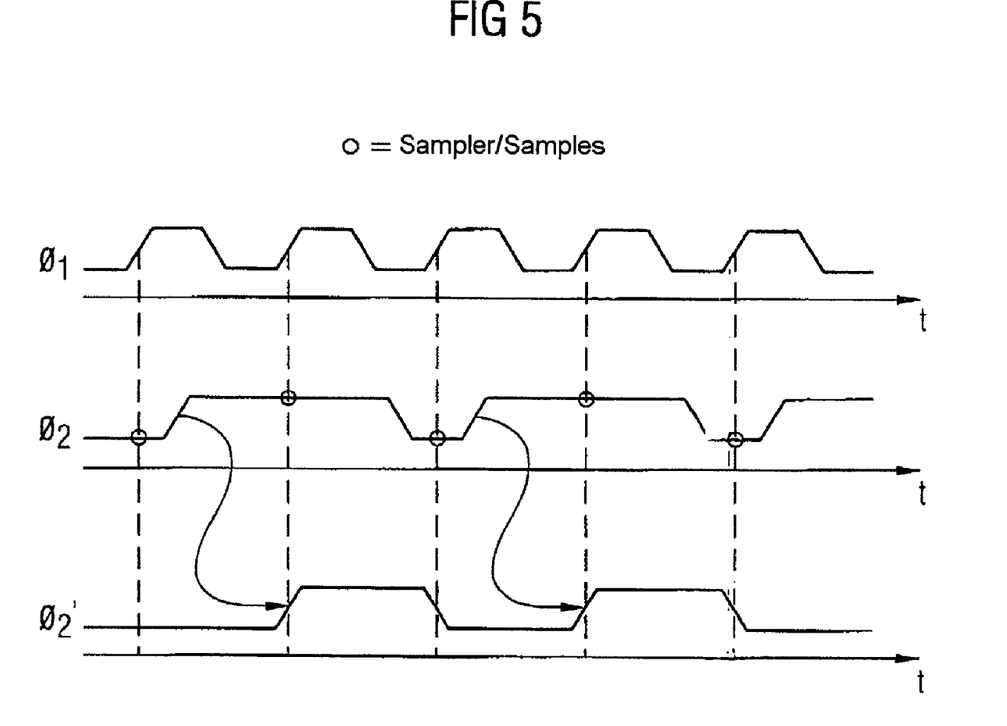
FIG. 5 shows timing diagrams to explain the way in which the inventive clock synchronization circuit works.

FIG. 5 shows a timing diagram for the two clock signals $\Phi_1$, $\Phi_2$ applied to the clock synchronization circuit 24 and for the reconstructed second clock signal $\Phi_2'$ generated by the clock synchronization circuit 24. The clock synchronization circuit 24 maps the rising signal edges of the second low-frequency clock signal $\Phi_2$ in the time frame of the first higher-frequency clock signal $\Phi_1$. The reconstructed second clock signal $\Phi_2'$ which is output is reset in this case in order to be able to detect the next rising edge of the second clock signal $\Phi_2$. The inventive clock synchronization circuit 24 reconstructs the second clock signal $\Phi_2$ in the time frame of the first clock signal $\Phi_1$ using a feedback loop. The feedback loop contains the clock delay circuit 44, which delays the clock signal $\Phi_2'$ applied to its signal input 47 by a prescribed number of clock cycles of the first clock signal $\Phi_1$ in order to output it at the output 49 at the time when the subsequent phase of the slower second clock signal $\Phi_2$ is expected. In this case, the time delay is set by the clock delay circuit 44 on the basis of the Edge-Too-Early signal ETE and the Edge-Too-Late signal ETL. The two signals ETE and ETL received from the logic circuit 38 contain information regarding whether the time delay brought about by the clock delay circuit 44 is too long or too short. The circuit design of the clock signal delay circuit 44 is explained in detail in connection with FIG. 7.

Figure 6A:
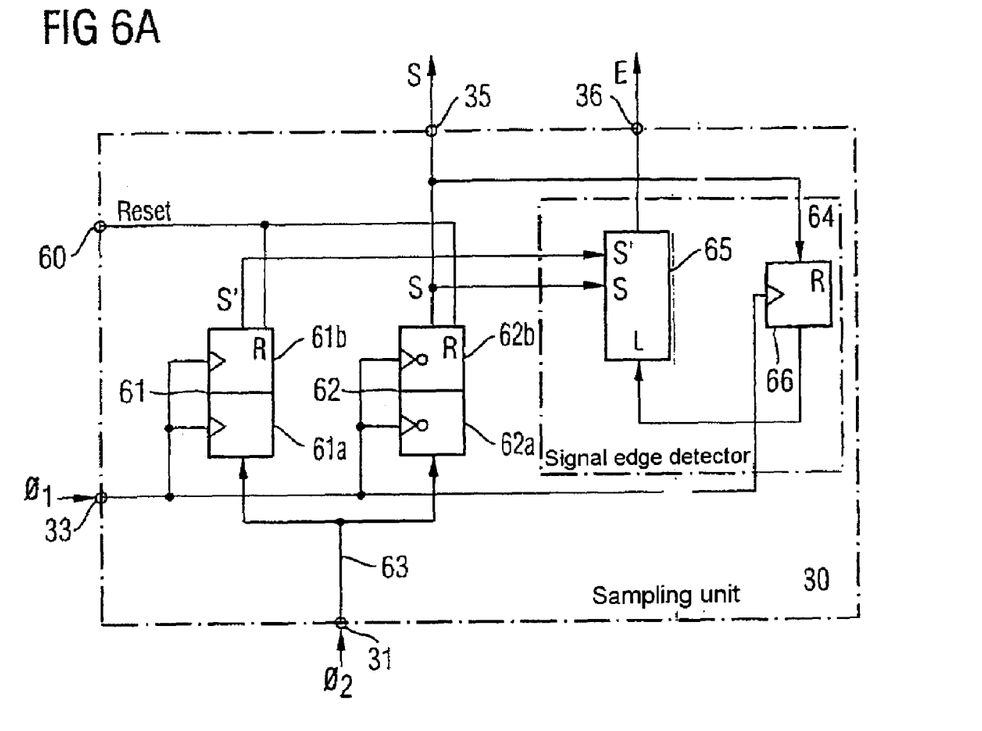
FIG. 6a shows a preferred embodiment of the sampling unit contained in the inventive clock synchronization circuit.

FIG. 6a shows a preferred embodiment of the sampling unit 30 contained in the inventive clock synchronization circuit 24. The sampling unit 30 is used to sample the second clock signal $\Phi_2$ using the first clock signal $\Phi_1$ in order to generate samples S and edge detection values E of the sampled second clock signal $\Phi_2$. To this end, the sampling unit 30 has a first clock signal input 33 for the first clock signal and a clock signal input 31 for the second slower clock signal $\Phi_2$. In addition, the sampling unit has a Reset input 60.

The sampling unit 30 contains a first register 61 and a second register 62. The first register 61 comprises two series-connected, edge-triggered flipflops 61a, 61b. The second register 62 comprises two series-connected, edge-triggered flipflops 62a, 62b. The first register 61a is used for sampling the second clock signal $\Phi_2$ with the rising signal edge of the first clock signal $\Phi_1$. The second register 62 is used for sampling the second clock signal $\Phi_2$ with the falling signal edge of the first clock signal $\Phi_1$. In this case, the two registers 61, 62 are connected in parallel for the purpose of receiving the second clock signal $\Phi_2$ via an internal line 63 in the sampling unit 30. The two registers 61, 62 can be reset using the Reset input 60.

Figure 6B:
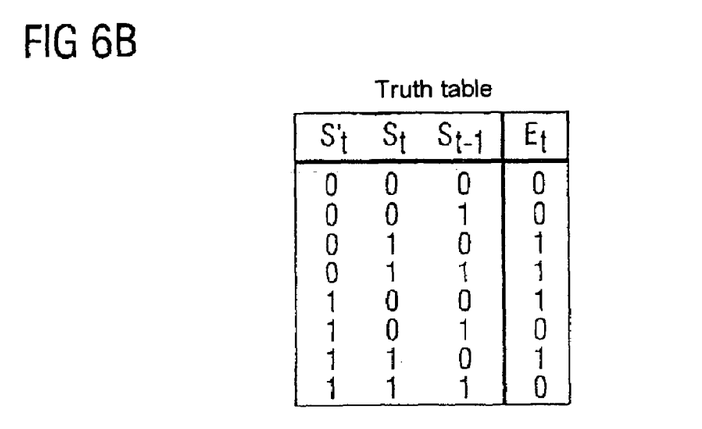
FIG. 6b shows a truth table for a signal edge detector contained in the sampling unit.

Besides the two sampling registers 61, 62, the sampling unit 30 contains a clocked signal edge detector 64. The signal edge detector 64 contains a logic unit 65, whose truth table is shown in FIG. 6b. In addition, the signal edge detector 64 contains a delay element 66. The sample S which is sent by the second register 62 is sent to the logic circuit 38 via the output 35 of the sampling unit 30. In addition, the sample S is supplied to the signal edge detector 64 and is delayed by one clock cycle of the first clock signal $\Phi_1$ by the delay element 66. The delay element 66 is preferably an edge-triggered flipflop which is clocked with the first clock signal $\Phi_1$. The signal edge detector 64 takes the sample S from the second register 62 and the sample S' from the first register 61 and also takes the sample which is sent at the output 35 in the previous clock cycle as a basis for sending an edge detection value E in line with the truth table shown in FIG. 6b.

Figure 7:
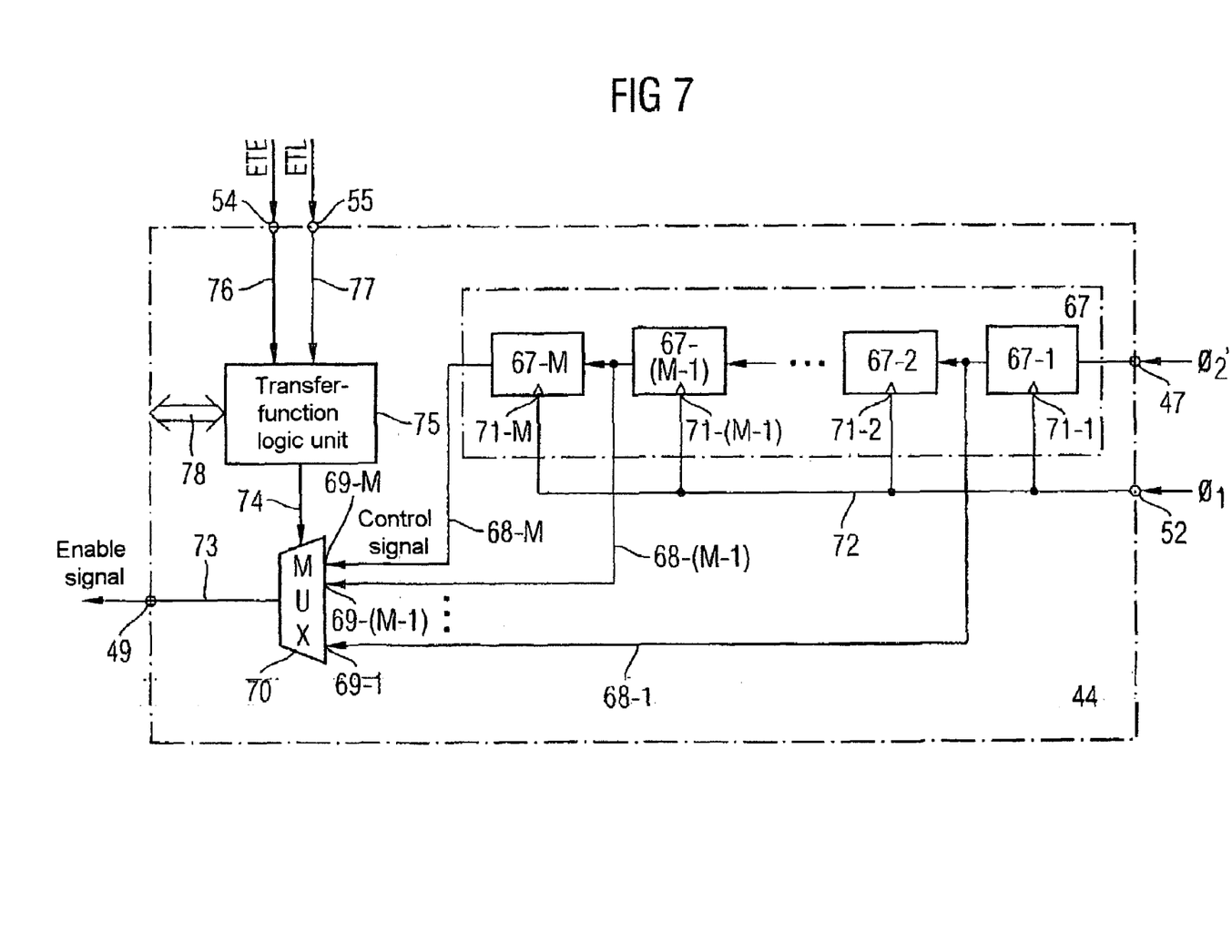
FIG. 7 shows a preferred embodiment of the signal delay circuit contained in the inventive clock synchronization circuit.

FIG. 7 shows a preferred embodiment of the clock signal delay circuit 44. The clock signal delay circuit 44 delays the reconstructed second clock signal $\Phi_2'$ which is present at the output 23 using a time delay $\tau$ which is a multiple of the clock cycle $T_1$ of the first clock signal $\Phi_1$. In this case, the multiplication factor N is set on the basis of the Edge-Too-Early signal ETE and the Edge-Too-Late signal ETL.

The signal delay circuit 44 comprises a chain of M delay elements 67-i, whose outputs are each connected to inputs 69 of a multiplexer 70 via lines 68. The delay elements 67 in the chain each have clock inputs 71 for applying the first clock signal $\Phi_1$ via an internal clock line 72. The signal delay circuit 44 uses its output 49 to send an Enable signal to the logic circuit 38. The output 49 of the signal delay circuit 44 is connected to the output of the multiplexer 70 via an internal line 73. The multiplexer 70 takes a control signal which it receives via a control line 74 as a basis for connecting one of its inputs 69i to the Enable signal output 49. The multiplexer 70 receives the control signal from a transfer-function logic unit 75 contained in the signal delay circuit 44 via the control signal line 74. The transfer-function logic unit 75 receives the Edge-Too-Early signal ETE and the Edge-Too-Late signal ETL from the logic circuit 38 via lines 76, 77. The transfer-function logic unit 75 may be hard-wired or, in one preferred embodiment, may contain a stored transfer function. In this context, the transfer-function logic unit 75 can be programmed using programming lines 78. The transfer function indicates whether the time delay as a result of the signal delay by the signal delay circuit 44 is too long or too short. The transfer function is a discrete function. It can cause an oscillation between two state values which are next to an optimum value. If the optimum time delay is 4.5 clock cycles, for example, the transfer function brings about alternative time delays of 4 or 5 clock cycles of the high-frequency first clock signal. The transfer function can be stipulated or programmed independently of the other circuits on the chip.

In one preferred embodiment, the following applies to the transfer function:

If $ETE_K$, $ETL_K$ specify the value of ETE, ETL for the n-th clock cycle of the high-frequency first clock signal $\Phi_1$, then the following is true:

For any delay time $\tau_0 \in [1,M] 4N$ $$S_k = \sum_{i=0}^{k} ETL_k - ETE_i$$

$$S_k > 1 \rightarrow \tau_{k+1} = \max(\tau_k - 1, l)$$

$$S_k < 1 \rightarrow \tau_{k+1} = \min(\tau_k + 1, M)$$

Figure 8:
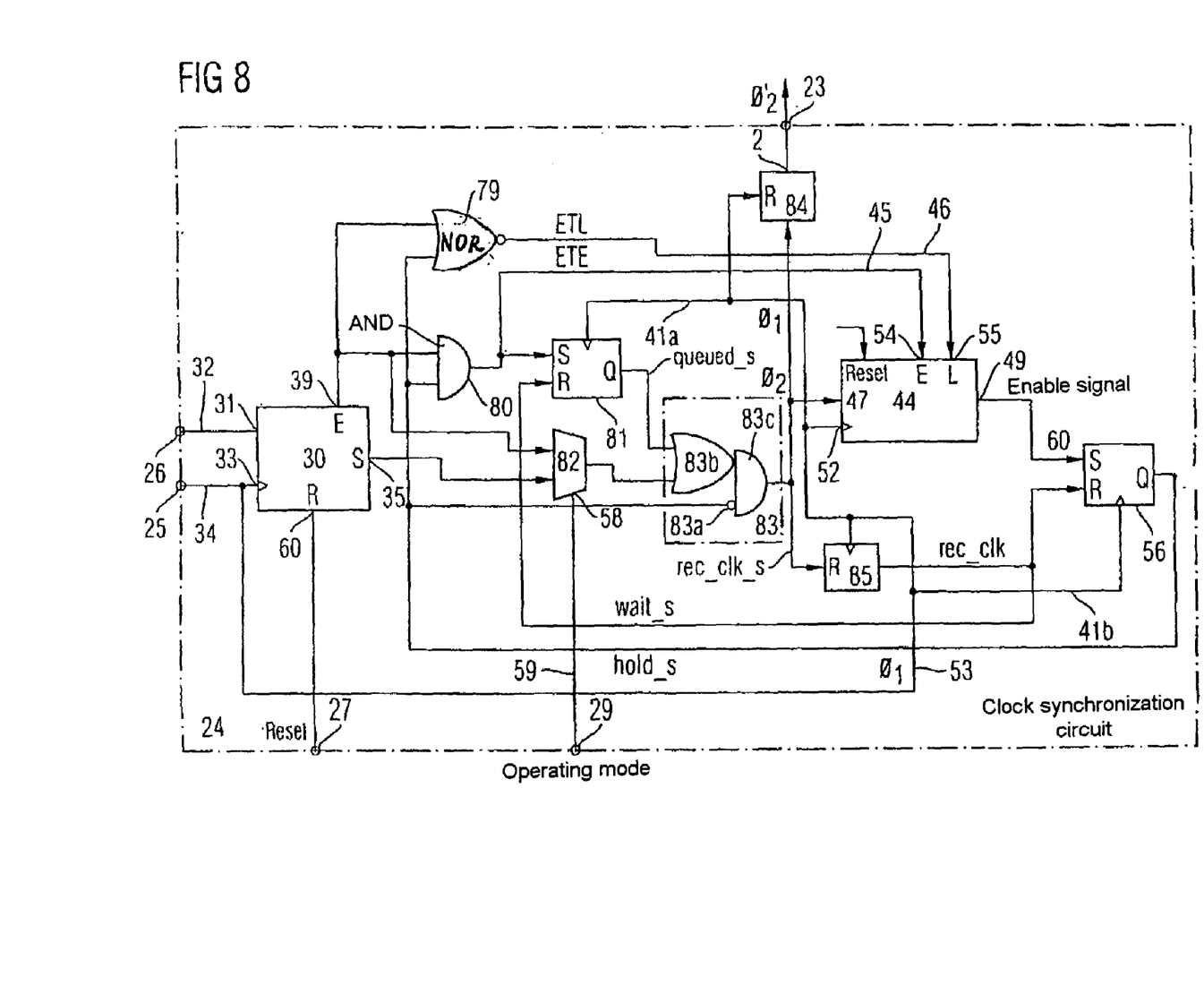
FIG. 8 shows a particularly preferred embodiment of the inventive clock synchronization circuit.

FIG. 8 shows one particularly preferred embodiment of the inventive clock synchronization circuit 24. In the case of the embodiment shown in FIG. 8, the logic circuit 38 has a special circuit design. The logic circuit 38 in this preferred embodiment comprises a NOR gate 79, an AND gate 80, a Set-Reset flipflop 81, a multiplexer 82, a logic unit 83, a buffer flipflop 84, a buffer flipflop 85 and a Set-Reset flipflop 86. The flipflops 81, 84, 85, 86 in the logic circuit 38 are clocked by the first clock signal $\Phi_1$.

Combinatorial Equations:

ETL=E$\vee\overline{\text{holds}}$

ETE=E$\wedge$hold $s$ rec ckl_s=$\overline{\text{holds}}\wedge$(queued_s$\vee$(mode$\wedge$s)$\vee$($\overline{\text{mode}}$ $\wedge$E))

hold_s=$\overline{\text{GO}}\wedge$(hold_r$\vee$recclk_r)

queued_s=ETE$\wedge$(queued_r$\wedge\overline{\text{recckl\_r}}$)

State Equations:

hold_r=hold_s queued_r=queued_s recclk_r=recclk_s $\Phi_2'$=recclk_o=rec_clk__r

In the case of the first Set-Reset flipflop 81, the Set input has priority, i.e. if both S and R are at logic 1 then the Set input has priority. In the case of the Set-Reset flipflop 86, the Reset input has priority.

The first Set-Reset flipflop 81 is preferably implemented by an edge-triggered flipflop which operates in line with the following rules on account of the high-frequency clock signal $\Phi_1$:

$Q$=0 when $R$=1 else 1 when $S$=1 else $Q_r$ $Q_r$=$Q$, when rising edge ($\Phi_1$)

The multiplexer 82 can be used to change over the logic circuit 38 between two operating modes.

In the first operating mode, the samples S are output as a reconstructed second clock signal $\Phi_2'$, and in the second operating mode the edge detection values E are output as a reconstructed second clock signal from the clock synchronization circuit 24. The multiplexer 82 has the logic circuit 83 connected downstream of it, said logic circuit comprising an inverter 83a, an OR gate 83b and an AND gate 83c.

The sample operating mode (value sampling mode) is activated if the frequency of the first clock signal is approximately of the same magnitude as the clock frequency of the second clock signal. In this case, the sampling unit 30 detects most signal edges. In the theoretical instance that the two clock frequencies are identical, the sampling unit 30 would not detect a signal edge and would identify a constant value. As the frequency difference between the two clock frequencies of the clock signals $\Phi_1$, $\Phi_2$ increases, the sampling unit comprises more and more signal edges.

In the edge operating mode, i.e. when the identified edge detection values E are output as a reconstructed second clock signal $\Phi_2'$, too short a delay involves a wait for the next signal edge before a new external clock signal period is regarded as having started.

In the sampling operating mode (value sampling mode), there is a wait for the next high logic value, and if the transfer function causes the signal delay to be too short then it is possible to identify a high logic value which belongs to the same logic high external clock signal phase and to take it into account as a new phase when the inventive clock synchronization circuit uses the signal delay circuit 44 to effect an adjustable signal delay, in order to form replicas of the slower clock signal $\Phi_2$ in the time frame of the faster clock signal $\Phi_1$.

The inventive clock synchronization circuit has the advantage that it contains no analog components. Since it also comprises no special components, the digital logic circuit 38 can easily be synthesized, i.e. can have standard cells written to it from a component library. The circuit design of the inventive clock synchronization circuit 24 is minor. Using the inventive clock synchronization circuit, the interface 1 between the function blocks 2, 3 can operate at a very high data throughput rate.

LIST OF REFERENCE SYMBOLS

1 Data transfer interface circuit
2 Function block
3 Function block
4 Clock line
5 Clock line
6 Data transfer buffer
7 Flipflop
8 Flipflop
9 Input
10 Line
11 Output
12 Line
13 Input
14 Output
15 Line
16 Input
17 Clock input
18 Clock input
19 Inverter
20 AND gate
21 Line
22 Line
23 Output
24 Clock synchronization circuit
25 Clock input
26 Clock input
27 Reset input
28 Unused
29 Operating-mode control input
30 Sampling unit
31 Clock signal input
32 Line
33 Clock signal input
34 Clock line
35 Output
36 Output
37 Line
38 Logic circuit
39 Line
40 Clock input
41 Clock line
42 Output
43 Line
44 Clock signal delay circuit
45 Line
46 Line
47 Input
48 Line
49 Output
50 Line
51 Input
52 Clock input
53 Clock line
54 Input
55 Input
56 Output
57 Output
58 Input
59 Line
60 Reset input
61 Register
62 Register
63 Clock line
64 Signal edge detector
65 Logic circuit
66 Flipflop
67 Delay elements
68 Lines
69 Multiplexer inputs
70 Multiplexers
71 Clock inputs
72 Clock line
73 Multiplexer output
74 Control signal line
75 Transfer-function logic unit
76 Line
77 Line
78 Programming lines
79 NOR gate
80 AND gate
81 Set-reset flipflop
82 Multiplexer
83 Logic circuit
84 Flipflop
85 Flipflop
86 Set-Reset flipflop

What is claimed is:

1. A clock synchronization circuit for synchronizing a first clock signal and a second clock signal for data transfer from a first function block, which is clocked by the first clock signal at a relatively high clock frequency, to a second function block, which is clocked by the second clock signal at a relatively low clock frequency, where the clock synchronization circuit has:

(a) a sampling unit for sampling the second clock signal using the first clock signal in order to generate samples and edge detection values of the sampled second clock signal;

(b) a logic circuit which is clocked using the first clock signal and which takes an operating-mode control signal as a basis for outputting the generated samples or the generated edge detection values as a reconstructed second clock signal in the time frame of the first clock signal at an output of the logic circuit, where the output of the logic circuit is reset after outputting a value until the logic circuit receives an Enable signal, where the logic circuit generates an Edge-Too-Early signal if the generated edge detection value is at logic high before the Enable signal is received, and generates an Edge-Too-Late signal if the Enable signal is received before the generated edge detection value is at logic high, (c) and a signal delay circuit which is clocked using the first clock signal, and which delays the reconstructed second clock signal sent by the logic circuit with a variable time delay on the basis of the Edge-Too-Early signal and the Edge-Too-Late signal in order to generate the Enable signal.

2. The clock synchronization circuit as claimed in claim 1, wherein the reconstructed second clock signal activates a first edge-triggered flipflop, clocked by the first clock signal in a data transfer buffer for buffering data which are output by the first function block.

3. The clock synchronization circuit as claimed in claim 2, wherein the first edge-triggered flipflop has a downstream second edge-triggered flipflop, clocked by the second clock signal, in the data transfer buffer, and this second edge-triggered flipflop sends the buffered data to the second function block.

4. The clock synchronization circuit as claimed in claim 1, wherein the signal delay circuit delays the reconstructed second clock signal with a time delay which is a multiple of the clock cycle of the first clock signal, the multiplication factor being a time-delay transfer function of the Edge-Too-Early signal and of the Edge-Too-Late signal.

5. The clock synchronization circuit as claimed in claim 4, wherein the time-delay transfer function is stored in a transfer-function logic unit in the signal delay circuit.

6. The clock synchronization circuit as claimed in claim 5, wherein the transfer-function logic unit controls a multiplexer for connecting one of the outputs of a chain of delay elements to the logic circuit as the Enable signal.

7. The clock synchronization circuit as claimed in claim 6, wherein the delay elements are clocked by the first clock signal.

8. The clock synchronization circuit as claimed in claim 5, wherein the transfer-function logic unit in the signal delay circuit is programmable.

9. The clock synchronization circuit as claimed in claim 1, wherein the sampling unit has:
 (a) a first register, comprising two series-connected, edge-triggered flipflops, for sampling the second clock signal with the rising signal edge of the first clock signal,
 (b) a second register, comprising two series-connected, edge-triggered flipflops, for sampling the second clock signal with the falling signal edge of the first clock signal, where the first register and the second register are connected in parallel in order to receive the second clock signal, and
 (c) a signal edge detector which is clocked by the first clock signal and which takes the sent sample from the first register and the sent sample from the second register and the sample which was output from the second register in the preceding clock cycle as a basis for sending an edge detection value to the logic circuit.

10. The clock synchronization circuit as claimed in claim 1, wherein the reconstructed second clock signal is sent to the second function block as an indicator signal, the indicator signal indicating that the data transfer buffer has data buffered in it which are to be read by the second function block.

* * * * *